(12) United States Patent
Tadokoro et al.

(10) Patent No.: US 8,748,029 B2
(45) Date of Patent: Jun. 10, 2014

(54) BATTERY PACK

(75) Inventors: Yukari Tadokoro, Sagamihara (JP); Karuki Hamada, Yokohama (JP); Tadashi Shoji, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/265,100

(22) PCT Filed: Apr. 21, 2010

(86) PCT No.: PCT/JP2010/057052
§ 371 (c)(1),
(2), (4) Date: Oct. 18, 2011

(87) PCT Pub. No.: WO2010/123023
PCT Pub. Date: Oct. 28, 2010

(65) Prior Publication Data
US 2012/0040236 A1 Feb. 16, 2012

(30) Foreign Application Priority Data

Apr. 24, 2009 (JP) ................................. 2009-106893

(51) Int. Cl.
*H01M 6/42* (2006.01)

(52) U.S. Cl.
USPC ........... 429/149; 429/158; 429/159; 429/160; 429/61

(58) Field of Classification Search
USPC ............... 429/149, 151, 156, 158, 160, 7, 61, 429/159, 99, 90, 92, 82
See application file for complete search history.

(56) References Cited

U.S. PATENT DOCUMENTS

| 5,456,994 A * | 10/1995 | Mita ................................ 429/71 |
| 8,039,145 B2 | 10/2011 | Ha et al. |
| 2009/0320715 A1 | 12/2009 | Morita et al. |

FOREIGN PATENT DOCUMENTS

| JP | 10-246112 | * | 9/1998 | ................ F01P 5/06 |
| JP | 10-246112 A | | 9/1998 | |
| JP | 2000-67836 A | | 3/2000 | |
| JP | 2000-223160 A | | 8/2000 | |
| JP | 2003-045384 A | | 2/2003 | |
| JP | 2003-300419 A | | 10/2003 | |
| JP | 2006-120489 A | | 5/2006 | |
| JP | 2006-278140 A | | 10/2006 | |
| JP | 2008-186725 A | | 8/2008 | |
| RU | 2 355 069 C2 | | 12/2008 | |
| WO | WO 2009/011162 A1 | | 1/2009 | |

OTHER PUBLICATIONS

Russian Decision on Grant, Dec. 18, 2013, 6 pages.
European Extended Search Report, Feb. 27, 2014, 5 pages.

* cited by examiner

*Primary Examiner* — Raymond Alejandro
(74) *Attorney, Agent, or Firm* — Foley & Lardner LLP

(57) ABSTRACT

A battery pack (1) includes: multiple battery modules (3, 5, 7) stacked in a vertical direction with a predetermined gap (G1) provided between the battery modules (3, 5) and with a predetermined gap (G2) between the battery modules (5, 7); and a battery controller (13) attached to sides of the battery modules (3, 5, 7) in such a manner as to face the predetermined gap (G1).

14 Claims, 4 Drawing Sheets

BATTERY PACK

TECHNICAL FIELD

The present invention relates to a battery pack.

BACKGROUND ART

Japanese Patent Unexamined Publication No. 2003-45384, for example, discloses a technique in which: a battery module is formed by arranging multiple batteries; and a battery pack is formed by combining multiple such battery modules. Particularly, in electric cars, such a battery pack is installed in the electric cars for use as drive sources for their motors.

SUMMARY OF THE INVENTION

Because, however, a conventional battery pack needs to be equipped with a dedicated cooling device so as to cool accessories such as a battery controller, the needs cause increase in weight and costs.

Against this background, an object of the present invention is to provide a battery pack which enables a battery controller to be efficiently cooled without being equipped with a dedicated cooling device.

In a battery pack of the present invention, multiple battery modules are stacked with a predetermined gap between each two adjacent battery modules, and a battery controller is attached to the battery modules in such a manner as to face the battery modules with a predetermined gap in between. Note that the battery module of the present invention is not limited to one formed from multiple batteries, and includes one formed from a single battery.

DESCRIPTION OF EMBODIMENTS

An embodiment of the present invention will be described below in detail together with the drawings.

Figure 1:
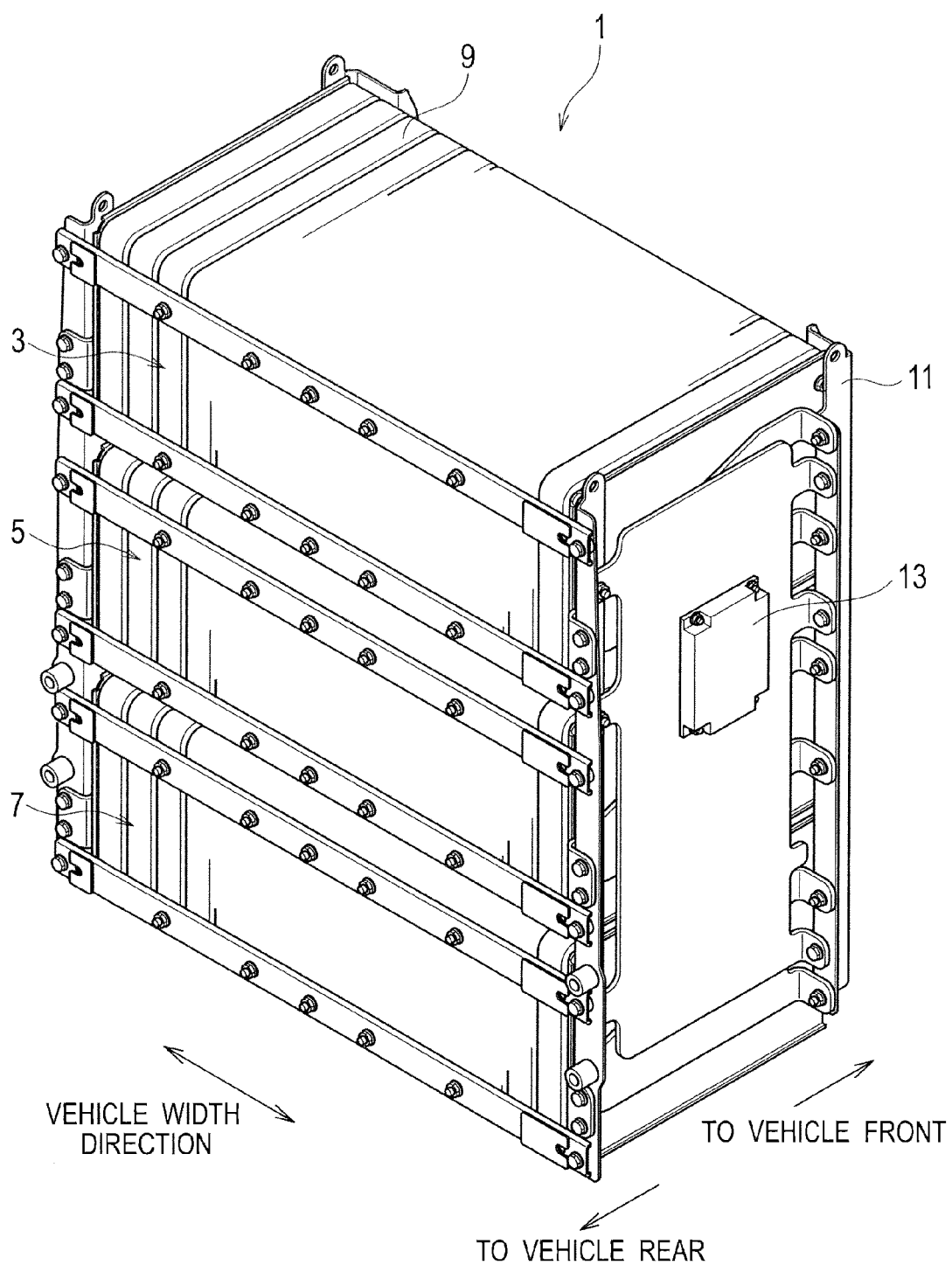
FIG. 1 is a perspective view showing a battery pack of an embodiment of the present invention.

FIG. 1 is a perspective view showing a battery pack of the embodiment of the present invention. Note that descriptions are given below of a battery pack in which battery modules each obtained by arranging multiple batteries in a thickness direction of the batteries are vertically stacked. However, the present invention can be also applied to a battery pack in which individual batteries are vertically stacked.

A battery pack 1 of the embodiment is formed from: three battery modules 3, 5, 7 which are vertically stacked; and accessories attached to side portions of the battery modules 3, 5, 7. While in an on-vehicle state, the battery pack 1 is disposed in a way that a frontward direction, a rearward direction, and a vehicle width direction are as shown by their respective arrows in FIG. 1. The three battery modules include: the upper battery module 3 disposed in the uppermost tier; the center battery module 5 disposed in the middle in a height direction; and the lower battery module 7 disposed in the lowermost tier. These battery modules 3, 5, 7 are connected together by elongated supporting plates 11 extending in a vertical direction. Moreover, in each of the battery modules 3, 5, 7, multiple plate-shaped batteries 9 are arranged side by side in the vehicle width direction (the thickness direction of the batteries 9), and are connected together. Furthermore, the aforementioned accessories include, specifically, a battery controller (for example, lithium-ion battery controller) 13, and wiring cords (not illustrated). The battery controller 13 is configured to control and monitor charge and discharge of the battery pack 1. Because heat is generated by this control and the like, the battery controller 13 needs to be cooled appropriately in order to maintain the temperature of the battery controller 13 at a predetermined temperature or below.

Figure 2:
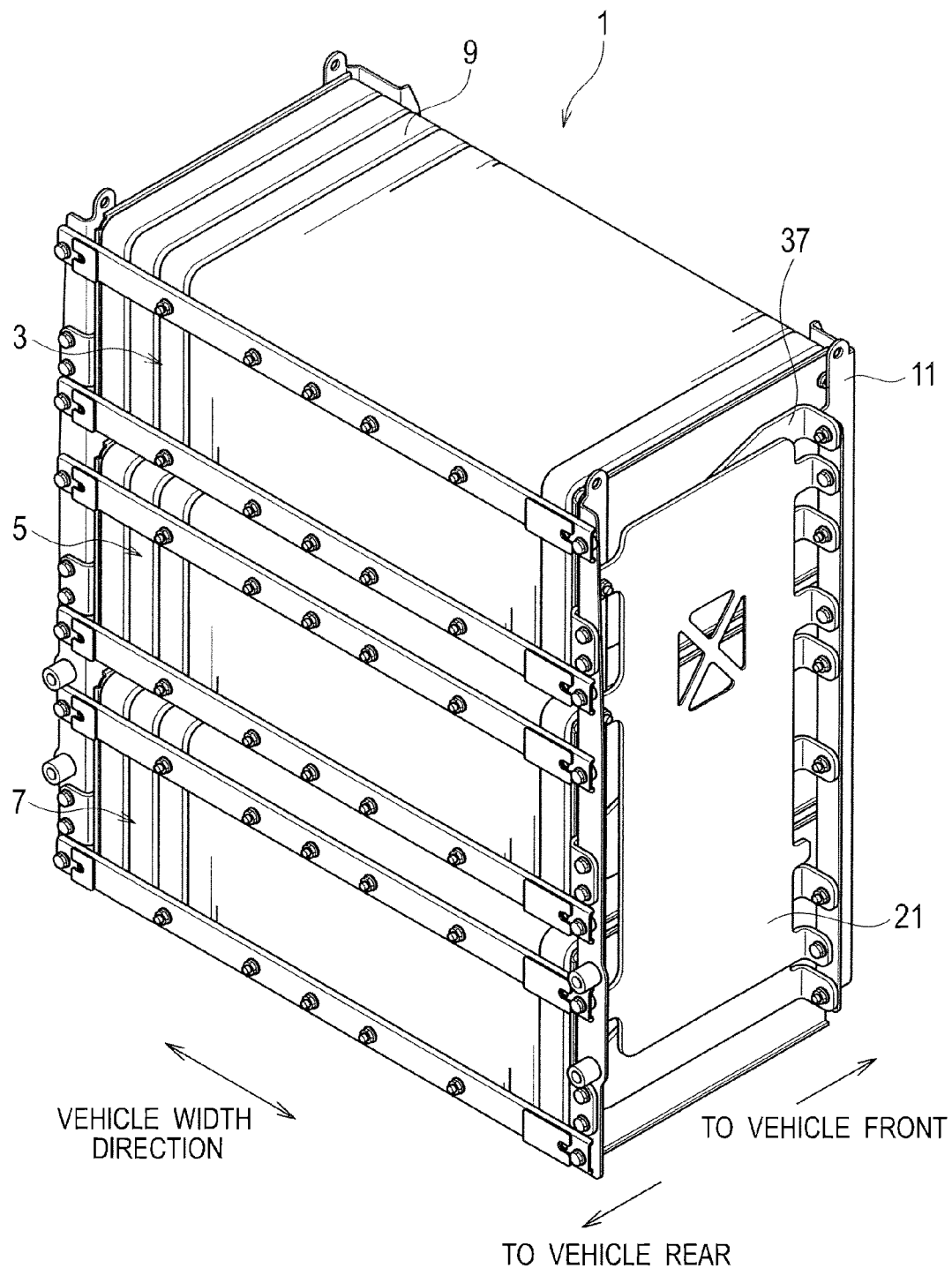
FIG. 2 is a perspective view showing a state where accessories are removed from the battery pack shown in FIG. 1.
Figure 3:
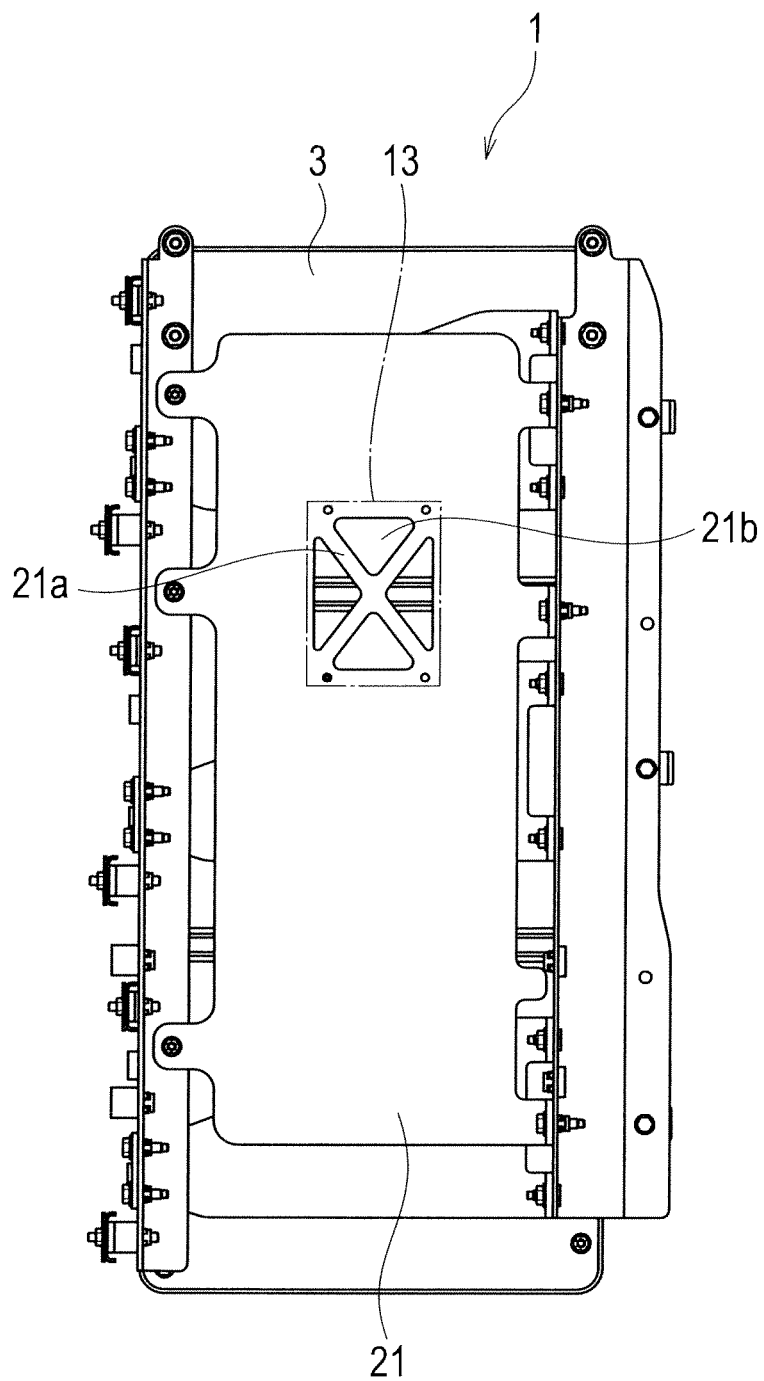
FIG. 3 is a side view of the battery pack shown in FIG. 2.

FIG. 2 is a perspective view showing a state where the accessories are removed from the battery pack shown in FIG. 1. FIG. 3 is a side view showing the battery pack shown in FIG. 2.

Reinforcement members 37, which will be described later, and an attachment plate 21 attached from above the reinforcement members 37 are provided in the side portion of the battery pack 1 from which the accessories are removed. Outer peripheral portions of the attachment plate 21 are fastened to a side surface of the battery pack 1 by use of bolts. Four opening portions 21*b* having an almost triangular shape are formed in an almost center portion of the attachment plate 21 in the height direction, by ribs 21*a* crossed substantially in an X-shape in a side view. The battery controller 13, which is indicated with a dashed-dotted line, is attached in a way that make the battery controller 13 cover the opening portions 21*b*. Note that the first gap G1 (see FIG. 4) provided between the upper battery module 3 and the center battery module 5 is placed, facing the opening portions 21*b* of the attachment plate 21.

Figure 4:
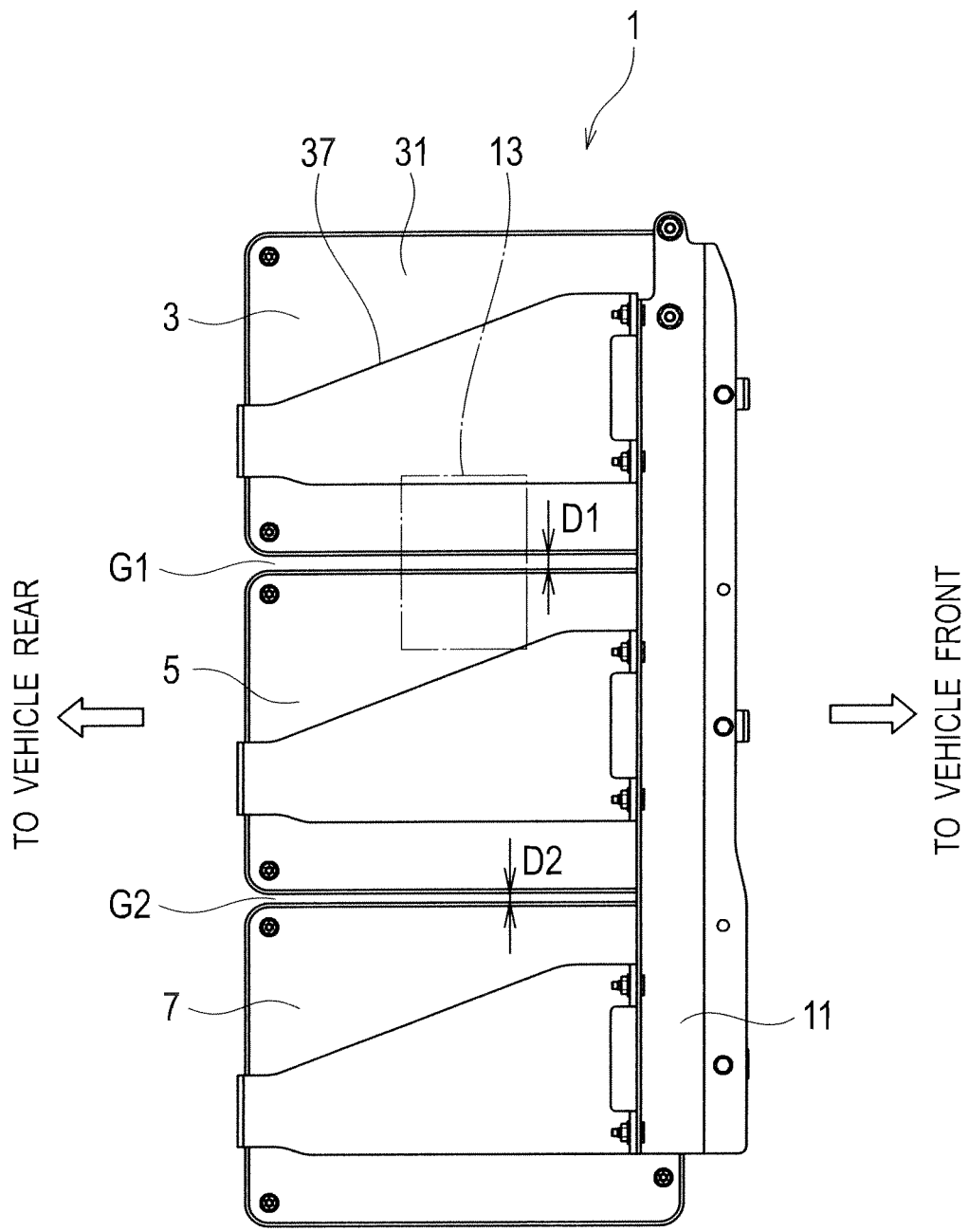
FIG. 4 is a side view showing a state where an attachment plate is removed from the battery pack of FIG. 3.

FIG. 4 is a side view showing a state where an attachment panel is removed the battery pack shown in FIG. 3.

As shown in FIG. 4, rectangular end plates 31 are provided on side surfaces of the upper battery module 3, the center battery module 5, and the lower battery module 7, respectively. The reinforcement members 37 are joined to the respective end plates 31. The reinforcement members 37 are connected to the elongated supporting plates 11 extending in a vertical direction.

Moreover, the first gap G1 is formed between the upper battery module 3 and the center battery module 5, and a second gap G2 is formed between the center battery module 5 and the lower battery module 7. To put it differently, a vertical distance between the upper battery module 3 and the center battery module 5 is D1, and a vertical distance between the center battery module 5 and the lower battery module 7 is D2. As described above, while in the on-vehicle state, the battery modules 3, 5, 7 are disposed with the predetermined gaps G1, G2 provided between the battery modules 3, 5, 7 in the vertical direction. D1 being the vertical dimension of the first gap G1 is formed to be larger than D2 being the vertical dimension of the second gap G2.

Then, the battery controller 13 is disposed, facing the first gap G1, as indicated with the dashed-dotted line.

Operations and effects of the embodiment will be described below.

The battery pack of the embodiment includes: the multiple battery modules 3, 5, 7 stacked with the predetermined gaps G1, G2 provided between the multiple battery modules 3, 5, 7; and the battery controller 13 attached to the side portion of the multiple battery modules 3, 5, 7 in such a manner as to face the predetermined gap G1.

As described above, the battery controller 13 controls and monitors the charge and discharge of the battery pack 1, and heat is generated by this control and the like. Accordingly, the battery controller 13 needs to be cooled. In this respect, since the first gap G1 and the second gap G2 are provided between the battery modules 3, 5, 7, the air is discharged to the outside through the first gap G1 and the second gap G2 by air convection. Thus, disposing the battery controller 13 to face the gaps G1, G2 enables the battery controller 13 to be efficiently cooled by natural convection without using a special device or the like.

Moreover, in the embodiment, D1 being the vertical dimension of the first gap G1 is formed to be larger than D2 being the vertical dimension of the second gap G2, and the battery controller 13 is disposed, facing the first gap G1 on the upper side. In the case where multiple gaps are provided as described above, the battery controller 13 can be efficiently cooled by making the battery controller 13 face the largest gap G1.

Note that the entire contents of Japanese Patent Application No. 2009-106893 (whose filing date is Apr. 24, 2009) are incorporated herein.

Although the contents of the present invention have been described by use of the embodiment, the present invention is not limited to the descriptions given above. It is obvious to those skilled in the art that various modifications and improvements can be made.

In the aforementioned embodiment, the battery controller 13 is disposed, facing the gaps G1, G2 between the battery modules 3, 5, 7 each formed from the multiple batteries 9. However, a configuration may be employed in which: individual batteries are stacked with predetermined gaps between the individual batteries; and a battery controller is attached to the individual batteries in such a manner as to face any of the gaps.

INDUSTRIAL APPLICABILITY

The present invention cools the battery controller by the air flow which flows out through the predetermined gap, because the battery controller is attached to the battery modules in such a manner as to face the predetermined gap which is one of the gaps formed between the multiple battery modules. Accordingly, the battery controller can be efficiently cooled without being equipped with a dedicated cooling device.

The invention claimed is:

1. A battery pack comprising:
   at least three battery modules stacked in a vertical direction;
   an attachment member that covers at least a portion of side surfaces of the at least three battery modules; and
   a battery controller attached to the attachment member,
   wherein a first open gap is formed between a first battery module and a second battery module of the at least three battery modules such that air is flowable through the first open gap,
   wherein a second open gap is formed between the second battery module and a third battery module of the at least three battery modules such that air is flowable through the second open gap,
   wherein the first open gap is larger than the second open gap, and
   wherein the battery controller is attached to the attachment member in a location horizontally adjacent to the first open gap.

2. The battery pack according to claim 1, wherein the second open gap is covered with the attachment member.

3. The battery pack according to claim 1, wherein the first battery module is an upper battery module, the second battery module is a center battery module, and the third battery module is a lower battery module.

4. The battery pack according to claim 1, wherein the at least three battery modules are connected together by a plurality of elongated support plates extending in a vertical direction.

5. The battery pack according to claim 1, wherein each of the at least three battery modules comprises a plurality of plate-shaped batteries arranged side-by-side in a thickness direction of the plate-shaped batteries.

6. The battery pack according to claim 1, wherein the battery controller is configured to control and monitor charge and discharge of the battery pack.

7. The battery pack according to claim 1, wherein the at least three battery modules are connected together by a plurality of elongated support plates extending in a vertical direction, and wherein outer peripheral portions of the attachment member are fastened to a side surface of the battery pack via the elongated support plates.

8. The battery pack according to claim 1, wherein the attachment member includes at least one opening portion.

9. The battery pack according to claim 8, wherein the at least one opening portion includes four opening portions, each having a triangular shape.

10. The battery pack according to claim 8, wherein the battery controller is attached to the attachment member and covers the at least one opening portion.

11. The battery pack according to claim 10, wherein the first open gap faces the at least one opening portion.

12. The battery pack according to claim 1, wherein end plates are disposed on side surfaces of each of the at least three battery modules.

13. The battery pack according to claim 12, wherein a plurality of reinforcement members are joined to respective ones of the end plates.

14. The battery pack according to claim 13, wherein the at least three battery modules are connected together by a plurality of elongated support plates extending in a vertical direction, and wherein the plurality of reinforcement members are connected to elongated support plates.

* * * * *